(No Model.) 6 Sheets—Sheet 1.
W. SMITH & J. P. O'DONNELL.
RAILWAY SIGNALING APPARATUS.
No. 437,802. Patented Oct. 7, 1890.
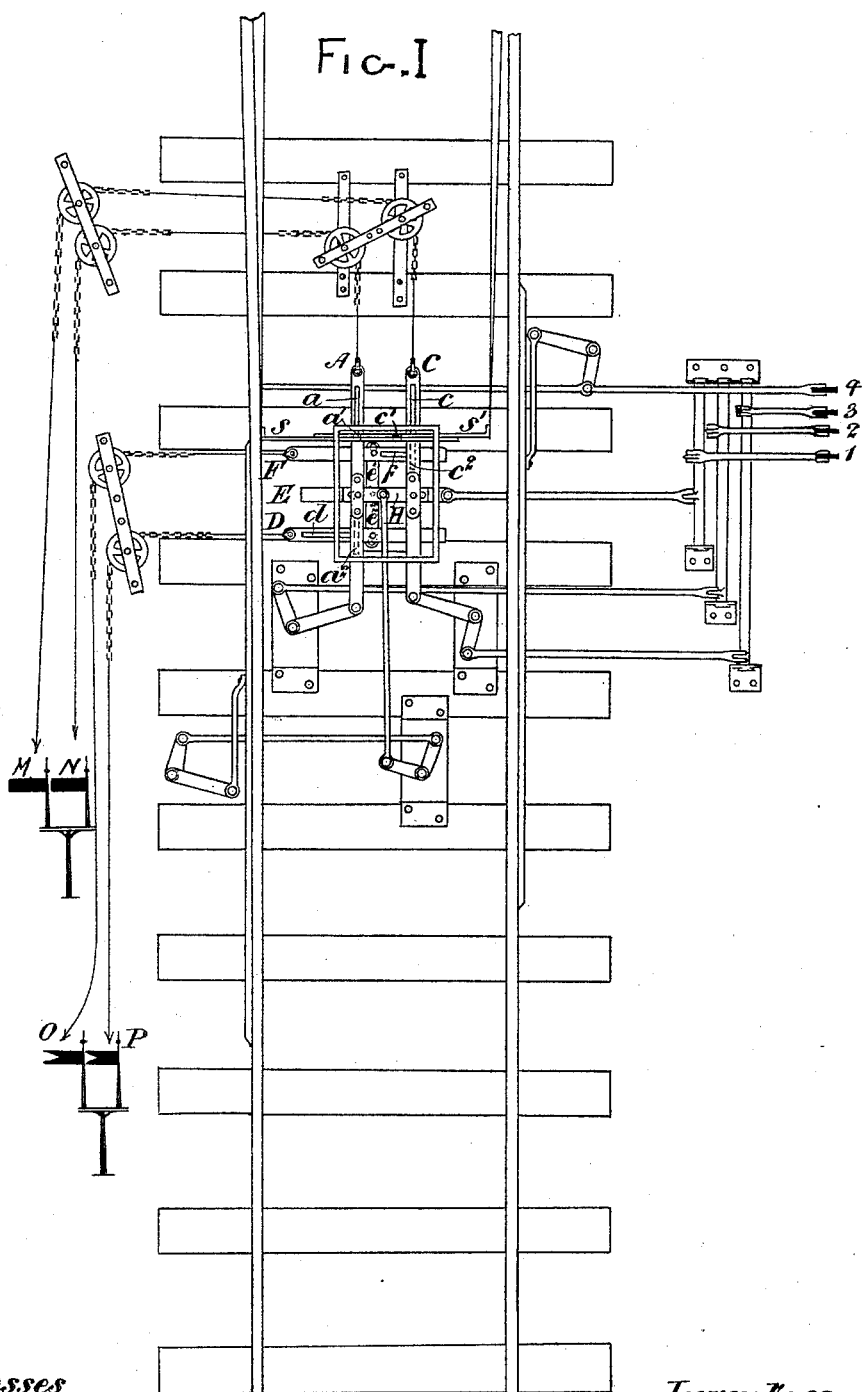
Witnesses
Arthur Woodman
William Candy
Inventors
William Smith
John Patrick O'Donnell
by John P. O'Donnell
Attorney (No Model.) 6 Sheets—Sheet 2.
W. SMITH & J. P. O'DONNELL.
RAILWAY SIGNALING APPARATUS.
No. 437,802. Patented Oct. 7, 1890.
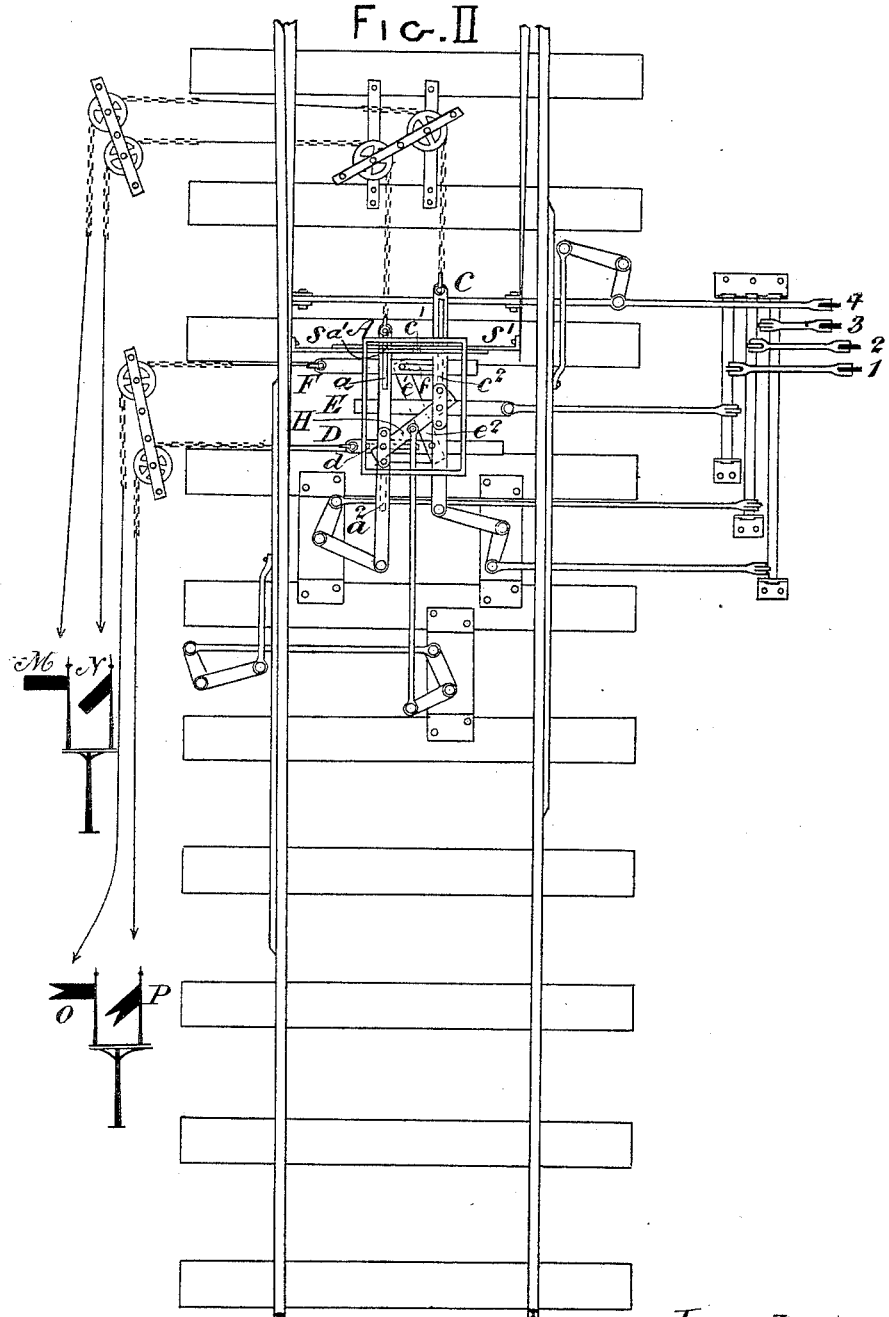
Witnesses
Arthur Woodman
William Candy
Inventors
William Smith
John Patrick O'Donnell
by
John P. O'Donnell
Attorney

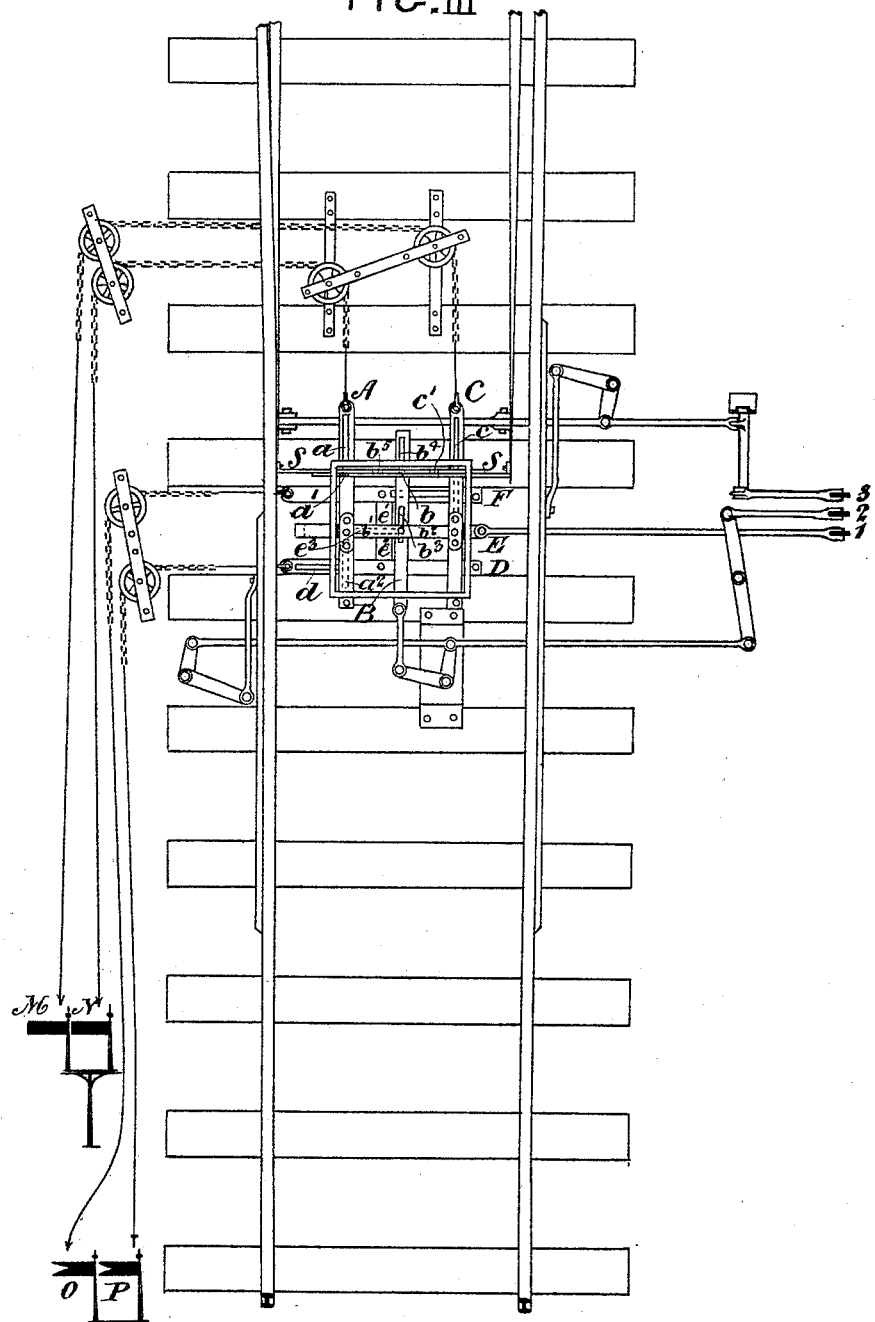

(No Model.) 6 Sheets—Sheet 4.
W. SMITH & J. P. O'DONNELL.
RAILWAY SIGNALING APPARATUS.
No. 437,802. Patented Oct. 7, 1890.
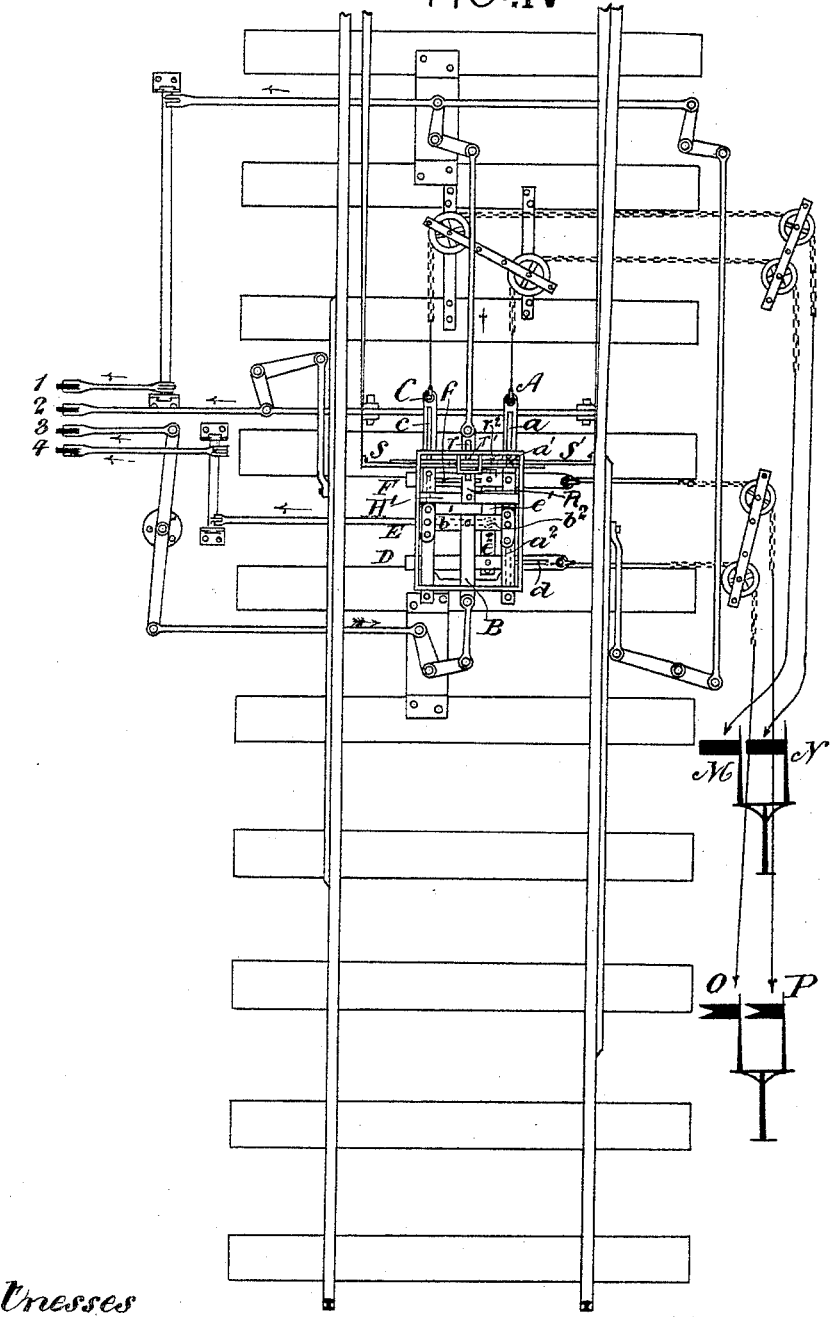
Fig. IV
Witnesses
Arthur Woodman
William Candys
Inventors
William Smith
John Patrick O'Donnell
by
Geo. P. O'Donnell,
Attorney (No Model.) 6 Sheets—Sheet 5.
W. SMITH & J. P. O'DONNELL.
RAILWAY SIGNALING APPARATUS.
No. 437,802. Patented Oct. 7, 1890.
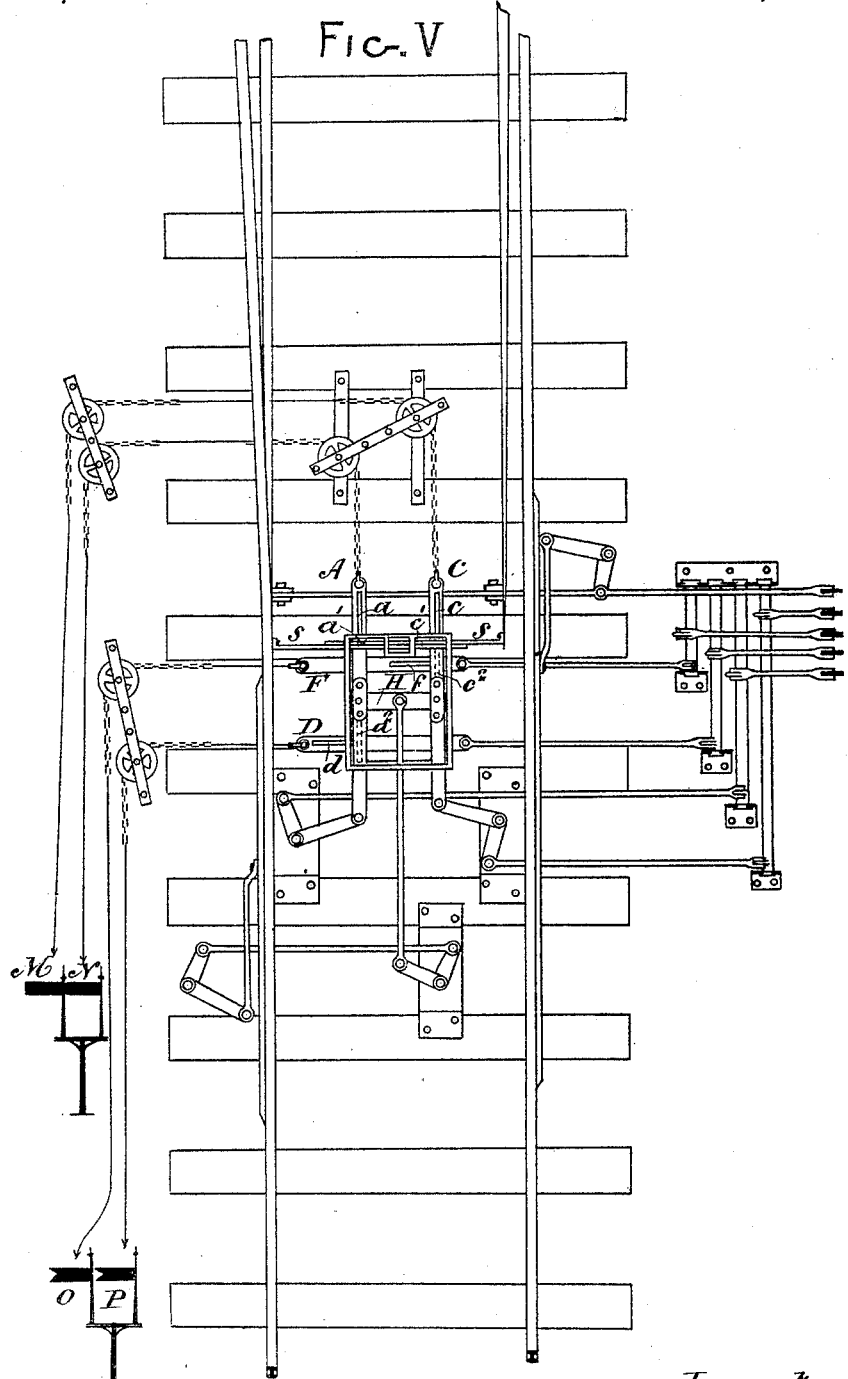
FIG. V
Witnesses
Arthur Woodman
William Candy
Inventors
William Smith
John Patrick O'Donnell
per
Jno. P. O'Donnell
Attorney (No Model.) 6 Sheets—Sheet 6.
W. SMITH & J. P. O'DONNELL.
RAILWAY SIGNALING APPARATUS.
No. 437,802. Patented Oct. 7, 1890
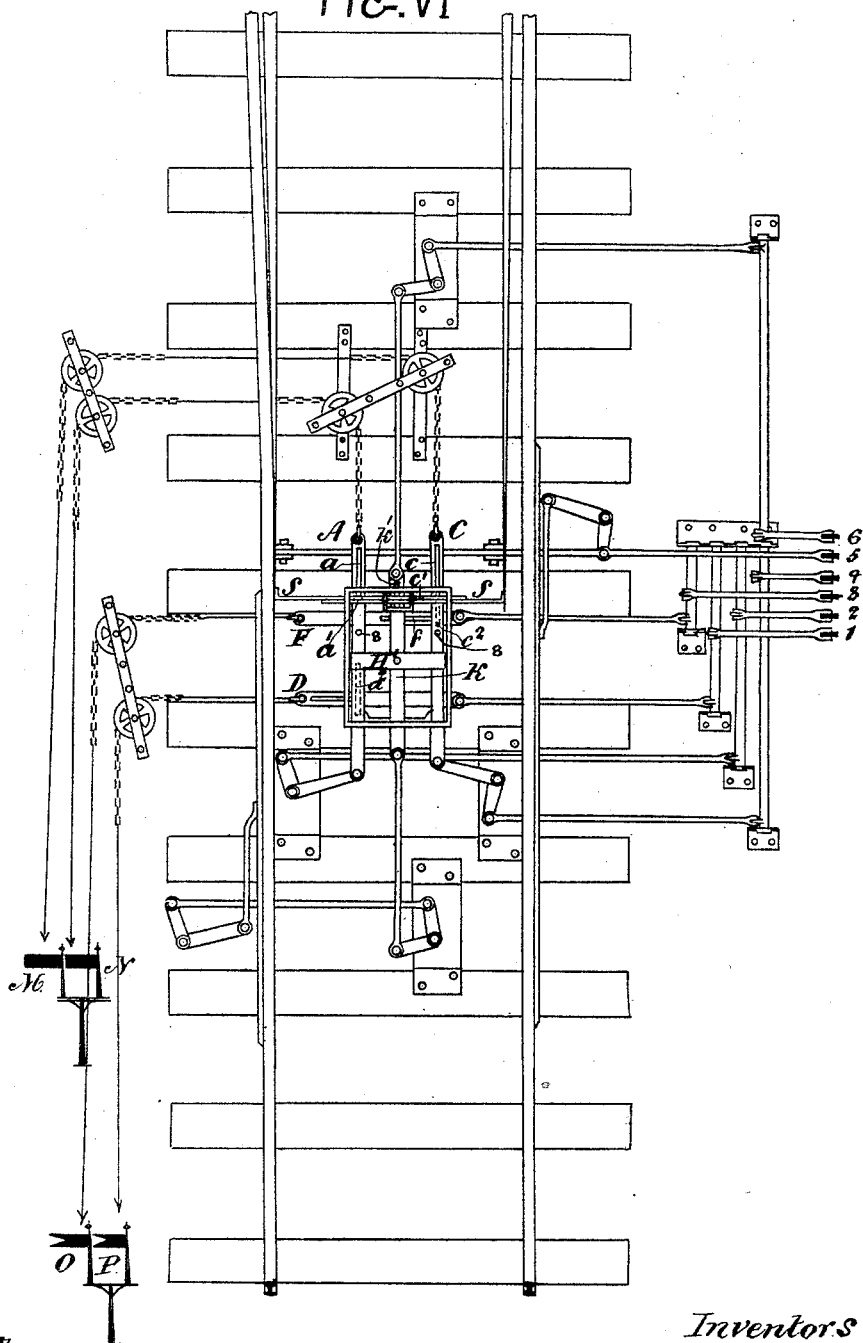
Fig. VI
Witnesses
Arthur Woodman
William Candy
Inventors
William Smith
John Patrick O'Donnell
per
John P. O'Donnell
Attorney

UNITED STATES PATENT OFFICE.

WILLIAM SMITH, OF HERNE HILL, COUNTY OF SURREY, AND JOHN PATRICK O'DONNELL, OF WESTMINSTER, COUNTY OF MIDDLESEX, ENGLAND.

RAILWAY SIGNALING APPARATUS.

SPECIFICATION forming part of Letters Patent No. 437,802, dated October 7, 1890.

Application filed March 7, 1890. Serial No. 343,050. (No model.) Patented in England January 30, 1888, No. 1,378.

*To all whom it may concern:*

Be it known that we, WILLIAM SMITH and JOHN PATRICK O'DONNELL, both subjects of the Queen of Great Britain, residing, respectively, at 150 Mayall Road, Herne Hill, in the county of Surrey, in England, and at 2 Great George Street, Westminster, in the county of Middlesex, in England, have invented a new and useful Improvement in Railway Signaling Apparatus, (for which we have obtained a patent in Great Britain, No. 1,378, bearing date January 30, 1888,) of which the following is a specification.

Our invention has reference to apparatus for working, ground-interlocking, and mutual detecting of railway points and signals; and it comprises arrangements and mechanism whereby both the main and branch junction signals can be worked by one lever and the corresponding distant signals by another lever.

The arrangements for working both the junction-signals by one lever are such as to constitute a point-detector, which determines which signal—that is, the main or the branch—shall be worked, according to the position of the points, the conflicting signals being locked and the working of the unlocked junction-signal having the effect of releasing the corresponding distant signal. We are thus enabled to do with two levers what has been hitherto usually done with five, or at least four, levers—that is to say, where there have been two levers for the two junction-signals, two for the two distant signals, and one for the facing-point lock. In the case of trailing points both the stop-signals for coming off two lines onto one line may be worked by one lever, the position of the trailing points determining which signal shall be lowered to "safety." When a signal is lowered, the points and conflicting signals are locked and the corresponding distant signal released.

In Figures I and II, while the selector-bar E works either D or F, the bars D and F may, when desirable, be worked by separate cabin-frame levers, as shown in Figs. V and VI.

In the most ordinary case of employment the slide-bar A would be connected to wire, chain, or rod connections, working, say, the main-line stop-signal, the slide-bar C to connections working the branch-line stop-signal, the signal slide-bar D of the secondary set to connections working the main-line distant signal, and, similarly, the slide-bar F of the secondary set to connections working the branch-line distant signal. Now when the points have been set right for the main line, as, say, in Fig. II, an attempt to draw A so as to work the main-line stop-signal will detect the perfect closing of the switch-tongue to its rail at S, because if the switch-points have not traveled their full throw the projecting rib $a$ on the upper face of A will not be able to pass through its counterpart notch or gap $a'$ on the lower face of the stretcher-bar S S'. As the efficient draft of A works the main stop-signal, the points become bolt-locked and will be only released on the complete return of A to its normal position. Again, the effectual draft of A carries its rib-piece $a^2$ on its under side clear of obstructing the path of the rib-piece $d$ on the upper face of D, and thus after the main stop-signal has been lowered to "safety" the main distant signal can be similarly lowered. Furthermore, A cannot be returned to its normal position until after D has been returned. Similarly, after the switch-tongue had been closed to its rail at S', C could be drawn to fulfill its detecting, locking, and signal-working functions, while F would repeat toward C the role of D toward A. Thus the five pull and return motions—viz., first, the switch-points; second, primary slide-bar A; third, primary slide-bar C; fourth, secondary slide-bar D, and, fifth, secondary slide-bar F—can be each worked efficiently in their correct rotation only, which rotation is automatically determined by the position of the switch-points. For doubly insuring the safe interlocking of the four signal slide-bars there may be extra locking-ribs, whereby A and F interlock with each other, and likewise C and D.

A distinctive feature in this invention is that the point-locking bolts or signal slide-bars A and C themselves are the medium through which their respective signals are worked, and that therefore should any of the connections between the signal-cabin and the said locking-bolts A and C (or their equivalents, plungers, as hitherto used,) become severed the signals cannot be lowered to the "safety" attitude.

Fig. III shows the selector-bar B employed additionally as a point-lock and as a detector acting not only by reason of the rib-piece $b^4$ on its upper face, but also the rib-piece $b^3$ on its upper face interlocking with $e^3$ on the lower face of E. The same figure also illustrates B worked by the same rod and crank connections as a facing-point treadle or safety-bar; but the connections and working of B may be managed in many other ways.

In Fig. III three cabin-frame levers are arranged to work all the points and signal movements; but in Fig. VI the signal slide-bars of both primary and secondary "sets" are worked direct without the intervention of joint selector-bars, and hence six cabin-frame levers are required.

The chief feature to be noted in Fig. VI is that the slide-bar K, intermediate and parallel to A and C, is not a selector-bar, like B in Fig. III, but practically the normal locking-bolt. It should here be particularly observed that K, by reason of its rib K′ in its normal position, can lock the points. The bar K is provided with a cross-bar H′, which engages with the projections 8 (see Fig. VI) on the bars A and C, when the said bar H′ is moved by the hand-lever 6, so as to bring the edge of the cross-bar H′ against the said projections. The cross-bar H′ (which may be a fixture or a rocking-lever arm) necessitates that K must be moved from its unlocking position into its normal locking position prior to or simultaneously with the movement of either A or C, but that the return of either A or C to their normal positions leaves K unaffected, although the movement of K from its normal to its unlocking position would insure the full return of A or C to their normal positions. In fact K (otherwise than with a selector-bar) has its normal position in the opposite direction to the normal positions of the right and left hand signaling slide-bars.

Figs. I and II show how a cross-bar H might be the medium for connecting the primary set A and C jointly to a facing-point safety-bar without H being mounted on either a selector-bar, like B, or a normal locking-bar, like K, for the safe acting of which the steadiest movement parallel to A and C is most desirable. Of course where no safety-bar is provided for the points the cross-bar H will be omitted.

Fig. V represents a modification of Fig. I, inasmuch as the signal slide-bars D and F of the secondary set are herein worked directly without the intervention of a point selector-bar E.

Five cabin-frame levers here suffice, and the simplification of the mechanism enables the action of H to be studied more clearly than elsewhere. However, the utility of this arrangement appears to be less than that of any other of the figures, since a lever-saving selector-bar may be most confidently applied to secondary, however much doubt may prevail (prior to extensive trial) as to their use in the more delicate situation of primary sets.

Fig. IV is the most complicated, and is intended to show both primary and secondary sets arranged to work each with their own selector-bar, while a normal locking-bolt M, with cross-bar H′, is included in the same apparatus. A normal locking-bolt M and selector-bar B can be contrived one on a higher and one on a lower plane, both parallel to A and C and both possessed of double bearings; but the figure as drawn affords an easier view or plan. A sliding frame might be substituted for the stretcher-bar S S′, while a fixed bed-plate and frame would take the place of the box-like case, which in the present illustrations furnishes the necessary stationary bearings of the sliding bars.

In Fig. V the bars F and D are provided with separate rods and levers for operating them, as clearly shown, the rods being pivoted to the ends of the said bars, and the signal-operating wires being connected to the opposite ends of the bars.

In Figs. II, III, and IV the bars F and D are operated from a single lever by means of the bar or blade E. This bar or blade E is centrally pivoted to the cross-arm $e′ e^2$ (this feature being most clearly shown in Fig. IV) by the pin $b^2$, and the ends of the said cross-arm are pivoted to the bars F and D. Whichever of the bars F or D is unlocked will be the one to be moved by the bar E, and the remaining (locked) bar will form the fulcrum for the stationary end of the cross-arm.

In Figs. II and V, H is a cross-arm pivoted at each end to the bars A and C. A rod is centrally connected to this cross-arm and operates the safety bar, the ends of the cross-arm H being fulcrums, alternately, according to whether the bar A or the bar C is locked. This cross-arm operates in a similar manner to the cross-arm $e′ e^2$, previously described.

What we claim as our invention, and desire to secure by Letters Patent, is—

1. The combination, with the points stretcher-bar provided with notches, of two primary signal slide-bars provided with ribs adapted to pass through said notches, and two secondary signal slide-bars crossing the said primary bars, both primary and secondary bars being respectively provided with interlocking ribs, whereby the said signal slide-bars can only be actuated in a certain rotation determined by the position of the points, substantially as set forth.

2. The combination, with the points stretcher-bar provided with notches, of two primary signal slide-bars provided with ribs adapted to pass through said notches, two secondary signal slide-bars crossing the said primary bars, both primary and secondary bars being respectively provided with interlocking ribs, whereby the said signal slide-bars can only be actuated in a certain rotation determined by the position of the points, and a selector-bar arranged parallel with and between the said secondary slide-bars and operatively connected to them, whereby both bars may be operated by a single lever, substantially as set forth.

3. The combination, with the points stretcher-bar provided with notches, of two primary signal slide-bars provided with ribs adapted to pass through said notches, two secondary signal slide-bars crossing the said primary bars, both primary and secondary bars being respectively provided with interlocking ribs, whereby the said signal slide-bars can only be actuated in a certain rotation determined by the position of the points, a selector-bar arranged parallel with and between the said primary slide-bars, and a second selector-bar arranged parallel with and between the said secondary slide-bars, both of the said selector-bars being operatively connected with their respective sets of primary and secondary slide-bars, whereby each set may be worked by a single lever, substantially as set forth.

Dated this 15th day of January, 1890.

WILLIAM SMITH.
JOHN PATRICK O'DONNELL.

Witnesses:
ARTHUR WOODMAN,
WILLIAM CANDY.